United States Patent
Hsieh et al.

(10) Patent No.: US 9,742,501 B2
(45) Date of Patent: Aug. 22, 2017

(54) OPTICAL COMMUNICATION SYSTEM AND OPTICAL TRANSMISSION DEVICE

(71) Applicant: INSTITUTE FOR INFORMATION INDUSTRY, Taipei (TW)

(72) Inventors: Hsiang-Chin Hsieh, New Taipei (TW); Hung-Yu Chen, Kaohsiung (TW); Chi-Wai Chow, Fanling (HK); Kevin Liang, Kaohsiung (TW); Chung-Yen Chen, New Taipei (TW); Chien-Hung Yeh, Hsinchu (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 14/962,314

(22) Filed: Dec. 8, 2015

(65) Prior Publication Data

US 2017/0149511 A1    May 25, 2017

(30) Foreign Application Priority Data

Nov. 23, 2015    (TW) .............................. 104138789 A

(51) Int. Cl.
*H04B 10/00*    (2013.01)
*H04B 10/80*    (2013.01)
(Continued)

(52) U.S. Cl.
CPC ........... *H04B 10/80* (2013.01); *H04B 10/116* (2013.01); *H04B 10/1121* (2013.01);
(Continued)

(58) Field of Classification Search
CPC ..... H04B 10/80; H04B 10/806; H04B 10/807
(Continued)

(56) References Cited

U.S. PATENT DOCUMENTS

| 6,914,893 B2 * | 7/2005 | Petite | G01V 1/364 |
| | | | 370/310 |
| 7,173,551 B2 * | 2/2007 | Vrazel | G11C 27/02 |
| | | | 341/144 |

(Continued)

FOREIGN PATENT DOCUMENTS

| EP | 2903187 A1 | 8/2015 |
| WO | 2014/015336 A2 | 1/2014 |

OTHER PUBLICATIONS

Wang et al: "On the Design of a Solar-Panel Receiver for Optical Wireless Communications With Simultaneous Energy Harvesting", IEEE Journal on Selected Areas in Communications, vol. 33, No. 8, Aug. 2015, pp. 1612-1623.*

(Continued)

*Primary Examiner* — Li Liu
(74) *Attorney, Agent, or Firm* — Rosenberg, Klein & Lee

(57) ABSTRACT

The present invention relates to an optical communication system and an optical transmission device. By changing the ratio between the first segment and the segment or/and the amplitude of the second segment, the digital signal is modulated and transmitted in the form of an optical signal. Then a solar panel, which is used as the receiver for the optical signal, can receive the optical signal and give directly the one or more digital signal without demodulation. Thereby, the costs of using a solar panel as the optical receiver may be reduced and the transmission rate may be enhanced.

11 Claims, 6 Drawing Sheets

(51) Int. Cl.
    *H04B 10/516*     (2013.01)
    *H04B 10/69*     (2013.01)
    *H04B 10/114*     (2013.01)
    *H04B 10/524*     (2013.01)
    *H04B 10/112*     (2013.01)
    *H04B 10/116*     (2013.01)
    *H04B 10/54*     (2013.01)

(52) U.S. Cl.
    CPC ..... *H04B 10/1129* (2013.01); *H04B 10/1141* (2013.01); *H04B 10/1149* (2013.01); *H04B 10/516* (2013.01); *H04B 10/524* (2013.01); *H04B 10/541* (2013.01); *H04B 10/69* (2013.01)

(58) Field of Classification Search
    USPC .......................................................... 398/171
    See application file for complete search history.

(56) References Cited

U.S. PATENT DOCUMENTS

| | | | |
|---|---|---|---|
| 7,536,112 | B2 | 5/2009 | Yonenaga et al. |
| 8,970,068 | B2* | 3/2015 | McCaslin ............... H02J 3/385 307/82 |
| 9,407,367 | B2* | 8/2016 | Guo ..................... H04B 10/116 |
| 2003/0067889 | A1* | 4/2003 | Petite ..................... G01V 1/364 370/310 |
| 2007/0297717 | A1* | 12/2007 | Watanabe ............ H04B 10/807 385/24 |
| 2009/0103925 | A1* | 4/2009 | Alpert ................. H04B 10/807 398/130 |
| 2009/0308426 | A1* | 12/2009 | Kernahan ......... H01L 31/02021 136/244 |
| 2010/0012819 | A1* | 1/2010 | Graham ................... H02J 5/00 250/205 |
| 2010/0054748 | A1* | 3/2010 | Sato ..................... H04B 10/116 398/130 |
| 2012/0087676 | A1* | 4/2012 | Lim ..................... H04B 10/116 398/182 |
| 2012/0205973 | A1* | 8/2012 | McCaslin ............... H02J 3/385 307/18 |
| 2014/0010540 | A1* | 1/2014 | Jeong ................... H04B 10/116 398/66 |
| 2014/0056589 | A1* | 2/2014 | Yeh ........................ H04B 10/11 398/119 |
| 2014/0301737 | A1* | 10/2014 | Guo ..................... H04B 10/116 398/118 |
| 2014/0321859 | A1* | 10/2014 | Guo ..................... H04B 10/116 398/118 |
| 2015/0003837 | A1* | 1/2015 | Lee ....................... H04N 9/3111 398/130 |
| 2015/0245448 | A1* | 8/2015 | Readler ............. H05B 37/0272 398/106 |
| 2016/0156308 | A1* | 6/2016 | Alon ....................... H02S 40/34 136/244 |
| 2016/0172860 | A1* | 6/2016 | Lipan ..................... H02J 3/383 307/52 |
| 2016/0191159 | A1* | 6/2016 | Aoyama ............. H04N 21/436 398/172 |
| 2016/0218553 | A1* | 7/2016 | He ......................... H02J 7/0036 |
| 2016/0308614 | A1* | 10/2016 | Tsonev ................. H04B 10/116 |
| 2016/0344226 | A1* | 11/2016 | Wu ........................ H02J 7/025 |

OTHER PUBLICATIONS

Hung-Yu Chen, Kevin Liang, Chung-Yen Chen, Shih-Hao Chen, Chi-Wai Chow; Passive Optical Receiver for Visible Light Communication (VLC); Department of Photonics and Institute of Electro-Optical Engineering, National Chiao Tung University, Nov. 1, 2015.

* cited by examiner

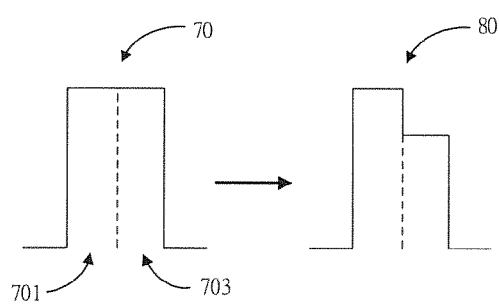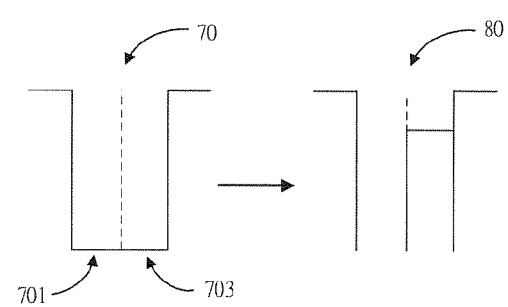
Figure 3A
Figure 3B

OPTICAL COMMUNICATION SYSTEM AND OPTICAL TRANSMISSION DEVICE

FIELD OF THE INVENTION

The present invention relates generally to an optical communication system, and particularly to an optical communication system and an optical transmission device that improve the transmission rate of using solar panels as the optical receiver.

BACKGROUND OF THE INVENTION

As the Internet develops rapidly, the technology of the Internet of Things (IoT) attracts significant attention increasingly and is applied extensively to various fields of daily lives.

The IoT enables interconnection of physical entities with connecting capability in the Internet. In the IoT, each physical entity may be accessed or controlled via the network. By means of the IoT, centralized management and manipulation may be performed on equipment, machines, and objects. The applications of the IoT is extremely extensive, including smart living environments, health and medical applications, and guard against burglary for belongings.

An optical communication system is a communication system using light waves as the transmission media. Although light waves and wireless radio waves are both a kind of electromagnetic waves, the frequency of the former is higher than that of the latter. Besides, the wavelength of light waves is shorter than that of wireless radio waves. These properties enable an optical communication system to have the advantages of high security, no electromagnetic interference (EMI), and high information capacity.

Normal optical communication systems adopt optic fibers, laser, infrared light, or ultraviolet light. According to the wavelength, optical communication systems may be classified into invisible-light and visible-light optical communication systems. Both types of optical communication systems may be used for data transmission.

In addition, thanks to the advantage of no EMI, optical communication systems may be applied in special places such as hospitals and airplanes. Thereby, optical communication is suitable for the communication in the IoT.

The receivers in an optical communication system may be categorized into active and passive receivers. Due to the requirement of an external power supply for providing extra driving power for an active receiver, the volume of the equipment having active receivers in increased. The demand of frequent replacement of batteries also makes the time of continuous usage inadequate. Beside, because the power cord should be connected to the power supply, the location for installing the equipment is limited. These are unfavorable to IoT applications. On the other hand, passive receivers have slower frequency response, resulting limited bandwidth of the received signals.

Currently, a solar panel is developed as the receiver of an optical communication system. The solar panel receives the lighting light, and the information contained in the lighting light may be extracted from the waveform of the output signal Nonetheless, when a solar panel acts as the receiver in an optical communication system, it is a passive receiver. As shown in FIG. 1, which shows an eye diagram of the transmission rate when using a solar panel as the receiver of an optical communication system, it is known that the transmission rate is only around 0.01 Mbit/s. Accordingly, an optical communication system is required to improve the transmission rate of using a solar panel as the receiver.

SUMMARY

An objective of the present invention is to provide an optical communication system. By modulating the amplitude of digital signals, the transmission rate of using a solar panel as the receiver may be improved.

Another objective of the present invention is to provide an optical transmission device for modulating the amplitude of digital signals.

In order to achieve the above objectives and efficacies, according to an embodiment of the present invention, an optical communication system is disclosed. The optical communication system comprises an optical transmission device and an optical receiving device. The optical transmission device comprises a modulation unit and a light-source unit. The optical receiving device comprises a solar panel. After one or more digital signal is modulated, the light-source unit transmits one or more optical signal to the solar panel. The solar panel generates one or more electric signal. According to the one or more electric signal, one or more digital signal is extracted.

According to an embodiment of the present invention, the one or more digital signal includes a first segment and a second segment. When the one or more digital signal is a high-level signal, the modulation unit reduces the amplitude of the second segment. When the one or more digital signal is a low-level signal, the modulation unit increases the amplitude of the second segment.

According to an embodiment of the present invention, the one or more electric signal is a voltage or a current.

According to an embodiment of the present invention, when the one or more electric signal is a high voltage or a high current, the one or more digital signal is a high-level signal. When the one or more electric signal is a low voltage or a low current, the one or more digital signal is a low-level signal.

According to an embodiment of the present invention, when the one or more electric signal is a high voltage or a high current, the one or more digital signal is a low-level signal. When the one or more electric signal is a low voltage or a low current, the one or more digital signal is a high-level signal.

According to an embodiment of the present invention, the optical transmission device further includes a control unit, which transmits a control signal to the modulation unit. The modulation unit adjusts the ratio or/and the amplitude of the first and second segments.

According to an embodiment of the present invention, the control unit adjusts the ratio or/and the amplitude of the first and second segments according to the bandwidth limitation of the solar panel.

According to an embodiment of the present invention, the optical receiving device further includes an electric storage unit, which is charged by the one or more electric signal.

According to an embodiment of the present invention, an electronic device is further included and connected electrically with the optical receiving device.

According to an embodiment of the present invention, the optical receiving device transmits the one or more digital signal to the electronic device.

According to an embodiment of the present invention, the electric storage unit supplies electrical power to the electronic device required for operations.

According to an embodiment of the present invention, the light-source unit transmits the one or more optical signal in the form of visible or invisible light.

According to an embodiment of the present invention, the electric storage unit is a capacitor or a battery.

Moreover, the present invention further provides an optical transmission device, which comprises a modulation unit and a light-source unit. The optical transmission device is configured for modulating one or more digital signal and transmitting the one or more modulated digital signal in the form of visible or invisible light.

According to an embodiment of the present invention, the optical transmission device further includes a control unit for controlling the modulation unit.

According to an embodiment of the present invention, the control unit controls the modulation unit according to the bandwidth limitation of a receiver.

According to an embodiment of the present invention, the light-source unit transmits the one or more optical signal in the form of visible or invisible light.

BRIEF DESCRIPTION OF THE DRAWINGS

FIG. 3A shows a schematic diagram of high-level modulation of the optical communication system according to the first embodiment of the present invention;

FIG. 3B shows a schematic diagram of low-level modulation of the optical communication system according to the first embodiment of the present invention;

DETAILED DESCRIPTION

In order to make the structure and characteristics as well as the effectiveness of the present invention to be further understood and recognized, the detailed description of the present invention is provided as follows along with embodiments and accompanying figures.

According to the prior art, the transmission rate of using a solar panel as the receiver of an optical communication system is inferior. According to the present invention, the amplitude of an optical signal is modulated before the optical signal is transmitted. Thereby, the transmission of using a solar panel as the receiver of an optical communication system is improved.

Figure 1:
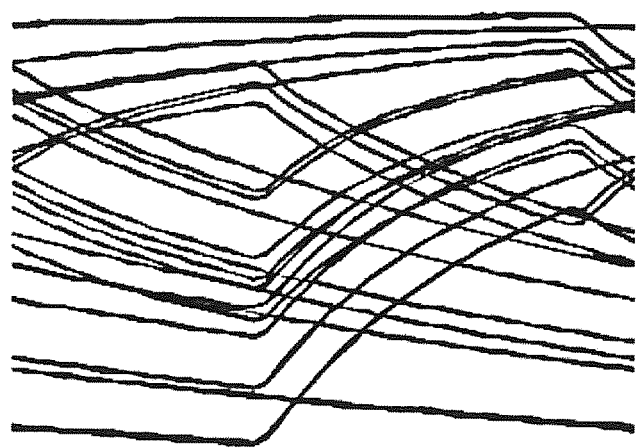
FIG. 1 shows an eye diagram of using a solar panel as the receiver in an optical communication system with the transmission rate of 0.01 Mbit/s.
Figure 2:
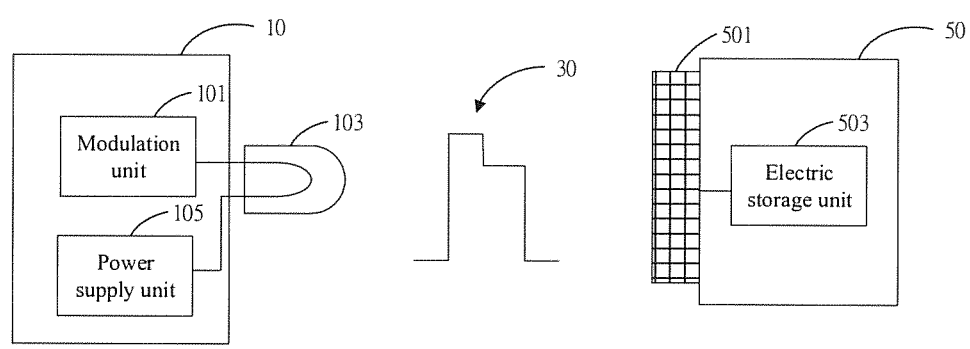
FIG. 2 shows a block diagram of the optical communication system according to the first embodiment of the present invention.

In the following, the required device for implementing the optical communication system according to the first embodiment of the present invention will be described. Please refer to FIG. 2, which shows a block diagram of the optical communication system according to the first embodiment of the present invention. As shown in the figure, the optical communication system according to the present invention comprises an optical transmission device 10 and an optical receiving device 50. The optical transmission device 10 transmits one or more optical signal 30 to the optical receiving device 50.

Here, the optical transmission device 10 is first described. The optical transmission device 10 comprises a modulation unit 101, a light-source unit 103, and a power supply unit 105. The modulation unit 10 is connected electrically with the light-source unit 103. The power supply unit 105 is connected electrically with the modulation unit 101 and the light-source unit 103. The modulation unit 101 is configured for modulating the digital signal to a modulated signal. The light-source unit 103 is configured for transmitting the modulated signal in the form of visible light, such as laser or LED, or invisible light, such as infrared or ultraviolet light. The power supply unit 105 provides the electric power for operating the modulation unit 101 and the light-source unit 103.

Next, the optical receiving device 50 will be described. The optical receiving device includes a solar panel 501 and an electric storage unit 503. The solar panel 501 will generate electric signals after receiving light. According to the one or more electric signal, the digital signal is extracted. The one or more electric signal is a voltage or a current. The electric storage unit 503 is a battery or a capacitor for storing electric energy.

In the following, the flow of executing the optical communication system according to the present invention will be described. Please refer to FIGS. 2, 3A, and 3B, where the latter two figures show schematic diagrams of high- and low-level modulation of the optical communication system according to the first embodiment of the present invention. The modulation unit 101 receives one or more digital signal 70. As the one or more digital signal 70 is a high- or low-level signal, it includes a first segment 701 and a second segment 703. As shown in FIG. 3A, when the one or more digital signal 70 received by the modulation unit 101 is a high-level signal, the modulation unit 101 lowers the amplitude of the second segment 703 of the one or more digital signal 70 and enables the one or more digital signal 70 to become one or more modulated signal 80. As shown in FIG. 3B, when the one or more digital signal 70 received by the modulation unit 101 is a low-level signal, the modulation unit 101 raises the amplitude of the second segment 703 of the one or more digital signal 70 and enables the one or more digital signal 70 to become one or more modulated signal 80. After the one or more digital signal 70 has been modulated to the one or more modulated signal 80, the light-source unit 103 receives the one or more modulated signal 80 and transmits the one or more optical signal 30 according to the one or more modulated signal 80.

The solar panel 501 of the optical receiving device 50 receives the one or more optical signal 30. After the solar panel 501 receives the one or more optical signal 30, it will generate one or more electric signal. According to the variation of the one or more electric signal, the one or more digital signal 70 is extracted. When the one or more electric signal is a high voltage or a high current, the one or more digital signal 70 is a high-level signal. When the one or more electric signal is a low voltage or a low current, the one or more digital signal 70 is a low-level signal. Alternatively, a high voltage or a high current can represent a low-level signal whereas a low voltage or a low current can represent a high-level signal. For example, when the one or more electric signal is a voltage, a 5-volt voltage indicates that the digital signal 70 is a high-level signal and a 1-volt voltage indicates that the digital signal 70 is a low-level signal.

When the one or more electric signal is a current, a 5-ampere current indicates that the digital signal 70 is a low-level signal and a 1-ampere current indicates that the digital signal 70 is a high-level signal.

Because a solar panel is a passive receiver when it is used as the receiver in an optical communication system and it owns a low-pass characteristic, the one or more optical signal 30 transmitted by the light-source unit 103 according to the one or more modulation signal 80 will distort after the solar panel 501 receives it. On the contrary, according to the present invention, the one or more modulated signal 80 is modulated in its amplitude according to the above modulation and transmitted by the light-source unit 103 in the form of an optical signal. The solar panel 501 receives the one or more optical signal 30 and generates the one or more electric signal. Owing to the distortion, the variation of the one or more electric signal will be restored from the one or more modulated signal 80 to the one or more digital signal 70. In other words, by taking advantage of the characteristics of solar panels, the optical receiver needs no demodulation unit for demodulating the modulated signal for extracting the digital signal. Besides, the electric storage unit 502 is charged by the one or more electric signal.

Figure 4:
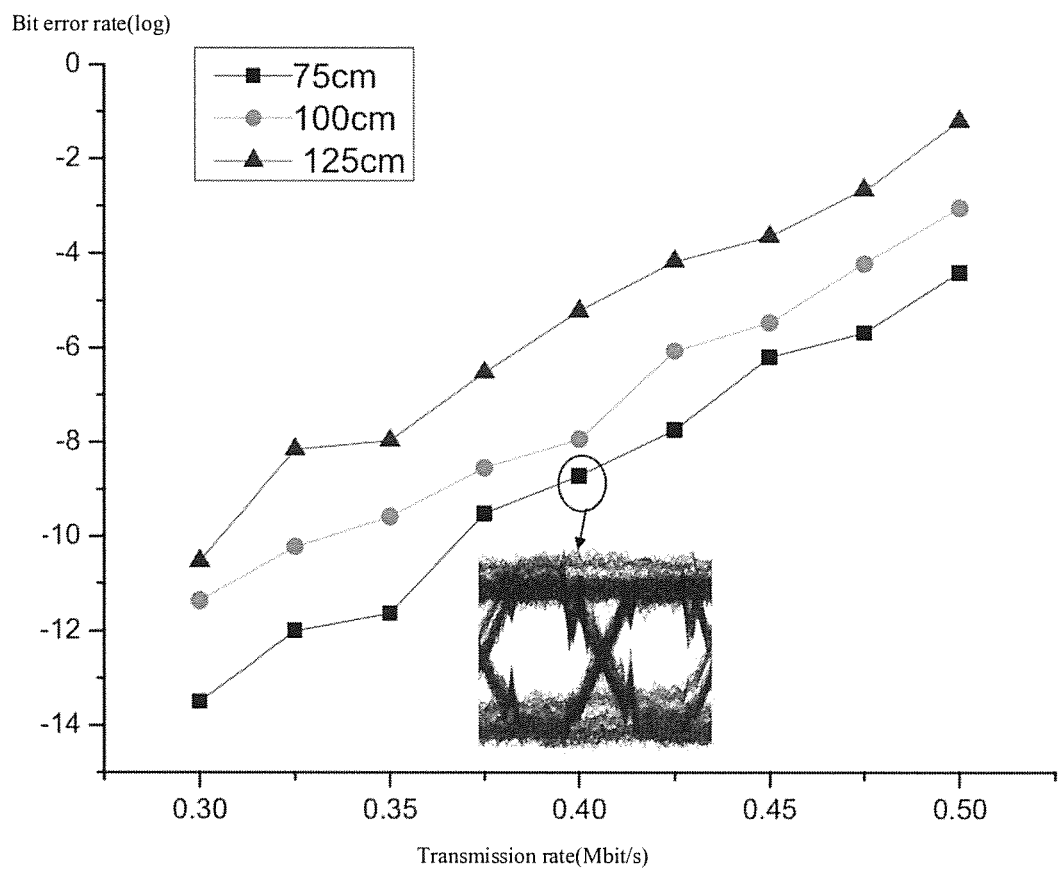
FIG. 4 shows a diagram of bit error rate as a function of transmission rate and an eye diagram for the optical communication system according to the first embodiment of the present invention.

Please refer to FIG. 4, which shows a diagram of bit error rate as a function of transmission rate and an eye diagram for the optical communication system according to the first embodiment of the present invention. As shown in the figure, when optical communication is performed using the optical communication system according to the first embodiment of the present invention, even at the transmission rate of 0.4 Mbit/s, excellent transmission performance is maintained.

Thereby, the optical communication system according to the first embodiment of the present invention is demonstrated. By the method of modulating the signal amplitude in advance, the transmission efficiency of using a solar panel as the receiver of an optical communication system is enhanced. In addition, no demodulation unit is required for the receiver, achieving the efficacies of improving performance and saving costs.

Figure 5:
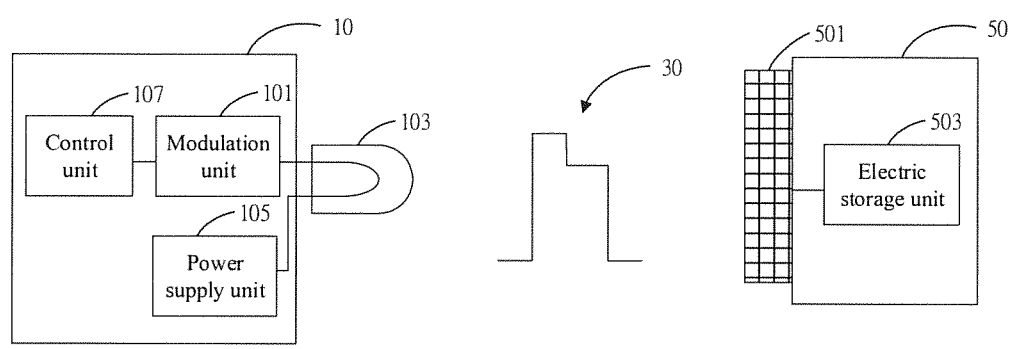
FIG. 5 shows a block diagram of the optical communication system according to the second embodiment of the present invention.

Next, the optical communication system according to the second embodiment of the present invention will be described. Please refer to FIG. 5, which shows a block diagram of the optical communication system according to the second embodiment of the present invention. As shown in the figure, the difference between the present embodiment and the first one is that the optical transmission device 10 according to the present embodiment further comprises a control unit 107 connected electrically with the modulation unit 101.

Solar panels with different bandwidths will distort the received signal to different degrees. Thereby, considering the bandwidth limitation of solar panels, it is required to enable the modulation unit 101 to modulate differently for the one or more digital signal 70. According to the present embodiment, the control unit 107 transmits a control signal to the modulation unit 101 according to the bandwidth limitation of the solar panel 501. Then the modulation unit 101 adjusts the ratios and amplitude of the first and second segments 701, 703 according to the control signal.

For example, when the bandwidth limitation of the solar panel 501 is 1K, the control signal transmitted by the control unit 107 will control the modulation unit 101 such that the ratio between the first and second segments 701, 703 is 1:1. Besides, when the one or more digital signal 70 is high, the amplitude of the second segment 703 is adjusted to 78% of the high-level signal; when the one or more digital signal 70 is low, the amplitude of the second segment 703 is adjusted to 76% of the high-level signal. The rest of the present embodiment is the same as the first embodiment. Hence, the details will not be described again.

By using the optical communication system according to the second embodiment of the present invention, the method for modulating the signal amplitude may be changed according to the bandwidth limitation of a solar panel and hence improving the transmission efficiency of using a solar panel as the receiver of an optical communication system. Consequently, any kind of solar panels may be adopted as the optical receiver, which increases universality of the present invention. Moreover, no demodulation unit is required for the receiver and thereby achieving the efficacies of enhancing performance and saving costs.

Figure 6:
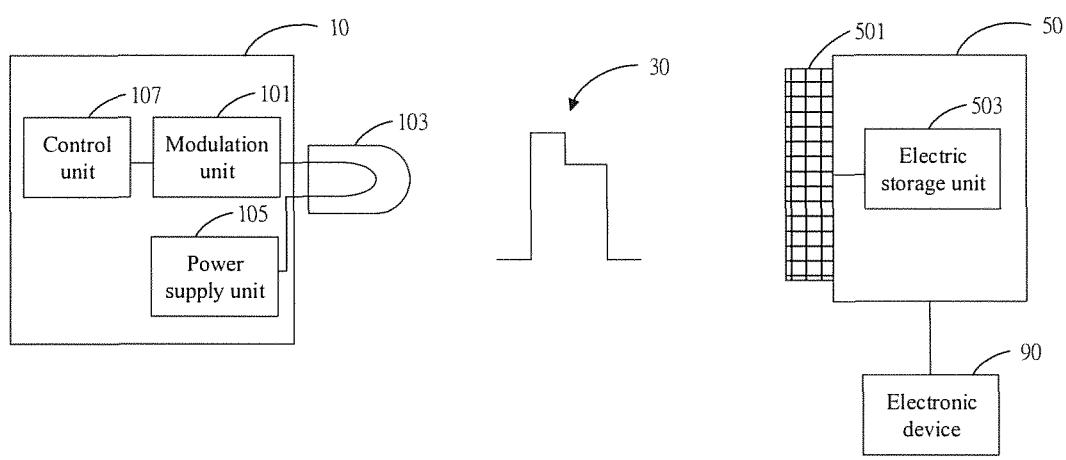
FIG. 6 shows a block diagram of the optical communication system according to the third embodiment of the present invention.

In the following, the optical communication system according to the third embodiment of the present invention will be described. Please refer to FIG. 6, which shows a block diagram of the optical communication system according to the third embodiment of the present invention. As shown in the figure, the difference between the present embodiment and the second one is that the present invention further includes an electronic device 90 connected electrically with the optical receiving device 50. The electronic device 90 is an electronic device capable of responding according to the one or more digital signal 70. Besides, the electric storage unit 503 supplies the electric power needed by the electronic device 90.

For example, the electronic device 90 may be a solar geyser. A user can use the optical transmission device 10 to transmit a signal for controlling or configuring the solar geyser. The electric storage unit 503 supplies the electric power needed by the solar geyser while heating water.

For example, the electronic device 90 may be a rotor for solar panel. A user can transmit a signal using the optical transmission device 10 for adjusting the orientation and posture of the solar panel. Then electric storage unit 503 supplies the electric power needed by the rotor for rotation.

For example, the electronic device 90 may be another optical transmission device 10. A user can use this additional optical transmission device 10 to extend the distance for transmitting digital signals. Here, the electric storage unit 503 supplies the electric power required by the additional optical transmission device 10 for transmitting optical signals.

According to an embodiment of the present invention, while applying the present invention, the one or more digital signal 70 may be a plurality of digital signals 70. The modulation unit 101 modulates the plurality of digital signals 70 to a plurality of modulated signals 80. The light-source unit 103 transmits a plurality of optical signals 30 according to the plurality of modulated signals 80. The solar panel 501 receives the plurality of the optical signals and generates a plurality of electric signals. According to the variation of the plurality of electric signals, the plurality of digital signals 70 may be extracted. For example, according to a practical application, a plurality of digital signals are 0101. After modulation by the modulation unit 101, a plurality of optical signals are transmitted by the light-source unit 103. A plurality of electric signals generated by the solar panel 501 when it receives the plurality of optical signals 30 are low, high, low, high voltages. According to the variation of the plurality of electric signals, the plurality of digital signal 70 may be extracted as 0101.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. An optical communication system, comprising:
an optical transmission device, comprising a modulation unit and a light-source unit, said modulation unit configured for receiving one or more digital signal and outputting one or more modulated signal to said light-source unit, and said light-source unit configured for transmitting one or more optical signal according to said one or more modulated signal; and
an optical receiving device, including a solar panel, said solar panel configured for receiving said one or more optical signal and generating one or more electric signal, and giving said one or more digital signal according to the variation of said one or more electric signal;
wherein said one or more digital signal includes a first segment and a second segment, said modulation unit reduces the amplitude of said second segment when said one or more digital signal is a high-level signal, and said modulation unit increases the amplitude of said second segment when said one or more digital signal is a low-level signal, said optical transmission device further includes a control unit transmitting a control signal to said modulation unit; and said modulation unit adjusts the ratio or/and amplitude of said first segment and said second segment of said one or more digital signal according to said control signal, said control unit adjusts the ratio or/and amplitude of said first segment and said second segment according to the bandwidth limitation of said solar panel.

2. The optical communication system of claim 1, wherein said one or more electric signal is a voltage or a current.

3. The optical communication system of claim 2, wherein said one or more digital signal is a high-level signal when said one or more electric signal is a high voltage or a high current, and said one or more digital signal is a low-level signal when said one or more electric signal is a low voltage or a low current.

4. The optical communication system of claim 2, wherein said one or more digital signal is a low-level signal when said one or more electric signal is a high voltage or a high current, and said one or more digital signal is a high-level signal when said one or more electric signal is a low voltage or a low current.

5. The optical communication system of claim 1, wherein said optical receiving device further includes an electric storage unit charged via said one or more electric signal.

6. The optical communication system of claim 5, further comprising an electronic device connected electrically with said optical receiving device.

7. The optical communication system of claim 6, wherein said electronic device receives said one or more digital signal and said electric storage unit supplies the electric power required by said electronic device for operation.

8. The optical communication system of claim 1, wherein said light-source unit transmits said one or more optical signal in the form of visible or invisible light.

9. The optical communication system of claim 1, wherein said electric storage unit is a capacitor or a battery.

10. An optical transmission device, comprising:
a modulation unit, configured for receiving one or more digital signal and outputting one or more modulated signal, wherein said one or more digital signal includes a first segment and a second segment, said modulation unit reduces the amplitude of said second segment when said one or more digital signal is a high-level signal, and said modulation unit increases the amplitude of said second segment when said one or more digital signal is a low-level signal;
a control unit, transmitting a control signal to said modulation unit, and said modulation unit adjusting the ratio or/and amplitude of said first segment and said second segment according to said control signal, said control unit adjusts the ratio or/and amplitude of said first segment and said second segment according to the bandwidth limitation of a receiver and said receiver is a solar panel; and
a light-source unit, receiving said one or more modulated signal, and transmitting one or more optical signal according to said one or more modulated signal.

11. The optical transmission device of claim 10, wherein said light-source unit transmits said one or more optical signal in the form of visible or invisible light.

* * * * *